US010773287B2

(12) United States Patent
Kuhn et al.

(10) Patent No.: US 10,773,287 B2
(45) Date of Patent: Sep. 15, 2020

(54) CORELESS AUGER MANUFACTURE

(71) Applicant: Technical Systems (Pty) Ltd, Cape Town (ZA)

(72) Inventors: Mattheus Willem Johannes Kuhn, Cape Town (ZA); Hendrick Willem Van Deventer, Cape Town (ZA); Johan Lodewikus Erasmus, Cape Town (ZA)

(73) Assignee: Technical Systems (Pty) Ltd, Cape Town (ZA)

(*) Notice: Subject to any disclaimer, the term of this patent is extended or adjusted under 35 U.S.C. 154(b) by 369 days.

(21) Appl. No.: 15/557,009

(22) PCT Filed: Mar. 9, 2016

(86) PCT No.: PCT/IB2016/051325
§ 371 (c)(1),
(2) Date: Sep. 8, 2017

(87) PCT Pub. No.: WO2016/142871
PCT Pub. Date: Sep. 15, 2016

(65) Prior Publication Data
US 2018/0056355 A1    Mar. 1, 2018

(30) Foreign Application Priority Data
Mar. 10, 2015  (ZA) .................................. 2015/01609

(51) Int. Cl.
*B21C 47/14* (2006.01)
*B65G 33/12* (2006.01)
(Continued)

(52) U.S. Cl.
CPC ............ *B21C 47/143* (2013.01); *B21C 47/00* (2013.01); *B21C 47/045* (2013.01); *B21C 47/12* (2013.01);
(Continued)

(58) Field of Classification Search
CPC ........ B65H 54/00; B65H 54/80; B65H 54/82; B65H 54/28; B65H 57/00; B65H 57/28;
(Continued)

(56) References Cited

U.S. PATENT DOCUMENTS 1,740,612 A   12/1929   Lowe
2,595,747 A   5/1952    Andersen
(Continued)

FOREIGN PATENT DOCUMENTS

CA   2252127 A1   4/2000
CN   1060983 A    5/1992
(Continued)

OTHER PUBLICATIONS

English translation of Chinese Office Action and Search Report dated Dec. 28, 2018 for Chinese Application No. 201680015065, 7 pages.
(Continued)

*Primary Examiner* — Michael R Mansen
*Assistant Examiner* — Raveen J Dias
(74) *Attorney, Agent, or Firm* — TraskBritt

(57) ABSTRACT

A method for the handling of coreless auger, which is produced by an auger production machine from which the coreless auger emerges with a linear motion component and a rotational motion component, includes guiding the rotating auger for linear movement away from the production machine toward a temporary storage facility that has a cylindrical receptacle rotatable about its own axis and a coaxial rotatable feed guide having an axial inlet for formed auger and an outwardly directed outlet for directing formed auger toward an inner periphery of the cylindrical receptacle. The cylindrical receptacle is rotated and the feed guide is allowed to rotate about the axis of its inlet that is roughly coincident with the axis of auger entering the axial inlet of
(Continued)

the feed guide. The cylindrical receptacle is rotated at a speed selected to counteract the rotation of the auger about its own axis.

10 Claims, 2 Drawing Sheets

(51) Int. Cl.
 *B21C 47/12* (2006.01)
 *B21C 47/04* (2006.01)
 *B21C 47/00* (2006.01)
 *B65H 54/82* (2006.01)
 *B65H 57/28* (2006.01)
 *B21D 11/06* (2006.01)
 *B65G 33/14* (2006.01)

(52) U.S. Cl.
 CPC ............. *B65G 33/12* (2013.01); *B65H 54/82* (2013.01); *B65H 57/28* (2013.01); *B21D 11/06* (2013.01); *B65G 33/14* (2013.01); *B65H 2701/391* (2013.01)

(58) Field of Classification Search
 CPC ... B65H 2701/391; B21C 47/00; B21C 47/02; B21C 47/04; B21C 47/045; B21C 47/10; B21C 47/12; B21C 47/14; B21C 47/143; B21C 47/146; B21C 37/12; B21D 11/06; B21D 11/14; B21D 11/20
 See application file for complete search history.

(56) References Cited

U.S. PATENT DOCUMENTS

| | | | |
|---|---|---|---|
| 3,168,259 A | | 2/1965 | Cady |
| 4,047,543 A | * | 9/1977 | Burow ................. B21C 47/143 138/155 |
| 2005/0023401 A1 | * | 2/2005 | Hsu ....................... B21C 47/045 242/362 |
| 2010/0127111 A1 | | 5/2010 | Marangoni |
| 2013/0075516 A1 | * | 3/2013 | Fiorucci ................ B21C 47/143 242/361 |
| 2014/0070039 A1 | * | 3/2014 | Shen ...................... B65H 57/12 242/361 |
| 2014/0305262 A1 | * | 10/2014 | Hamilton ................. B21H 3/12 76/102 |

FOREIGN PATENT DOCUMENTS

| | | |
|---|---|---|
| DE | 2912162 A1 | 10/1980 |
| GB | 1459752 A | 12/1976 |
| JP | 56-070274 A | 6/1981 |
| JP | 59-199115 A | 11/1984 |
| JP | H480111 A | 3/1992 |
| WO | 0226410 A2 | 4/2002 |
| WO | 2009/154328 A1 | 12/2009 |

OTHER PUBLICATIONS

International Search Report for PCT Application No. PCT/IB2016/051325 dated Apr. 28, 2016, 4 pages.

Written Opinion of the International Searching Authority for PCT Application No. PCT/IB2016/051325 dated Apr. 28, 2016, 4 pages.

Chinese Second Office Action for Chinese Application No. 201680015065.0, dated Aug. 20, 2019, 9 pages with English Translation.

Supplementary European search report for European Application No. 16761182, dated Sep. 25, 2018, 1 page.

* cited by examiner

CORELESS AUGER MANUFACTURE

CROSS-REFERENCE TO RELATED APPLICATIONS

This application is a national phase entry under 35 U.S.C. § 371 of International Patent Application PCT/IB2016/051325, filed Mar. 9, 2016, designating the United States of America and published in English as International Patent Publication WO 2016/142871 A1 on Sep. 15, 2016, which claims the benefit under Article 8 of the Patent Cooperation Treaty to South African Provisional Patent Application Serial Number 2015/01609 filed on Mar. 10, 2015, which is incorporated by reference herein.

TECHNICAL FIELD

This application relates to what are commonly termed continuous coreless augers of helically formed flat steel wire and are widely used in conveying tubes of conveyor systems for conveying loose particulate and pulverized materials such as animal feeds, fertilizers and other agricultural soil or growth enhancing or controlling materials as well as minerals in processing plants.

An auger is, for use, typically installed loosely in a relatively stationery conveying tube and is rotated about a longitudinal axis in order to move the particulate material along the length of the conveying tube from an inlet to one or more discharge points in the manner of a screw conveyor.

BACKGROUND

Various methods have been used in order to manufacture coreless augers. All of those of which the applicant is aware result in an auger being produced that emerges from the auger manufacturing machine with a linear motion component and a rotational motion component; that is, it rotates about its own axis consequent on its formation from flattened wire. Existing manufacturing facilities temporarily feed the rotating auger product into a long tubular storage space of some form that typically assumes the form of a long pipe. The rotating auger is fed into this tubular space until a required length has been manufactured, or the maximum length of the tubular storage space has been reached, at which stage the auger is cut to release it from the auger manufacturing machine and thus stop it from rotating about its axis. The auger can then be coiled onto a transverse bobbin or mandrel while there is no rotation of the auger about its longitudinal axis.

This type of temporary storage facility limits the length of auger that can be continuously manufactured consequent on the limitation inherent in the temporary storage length required, as well as by the frictional drag between the auger that has been produced and the walls of the tubular storage space. The maximum length is usually from about 100 meters to about 300 meters, depending on the gauge and weight of the auger.

There is a need for an auger manufacturing facility that can overcome, at least to some extent, the problem identified above.

The preceding discussion of the background to the disclosure is intended only to facilitate an understanding of this disclosure. It should be appreciated that the discussion is not an acknowledgment or admission that any of the material referred to was part of the common general knowledge in the art as at the priority date of the application.

BRIEF SUMMARY

In accordance with one aspect of this disclosure, there is provided a method for the handling of coreless auger produced by an auger production machine from which the coreless auger emerges with a linear motion component and a rotational motion component, the method including the steps of guiding the rotating auger for linear movement away from the production machine toward a temporary storage facility that has a cylindrical receptacle rotatable about its own axis and a coaxial rotatable feed guide having an axial inlet for formed auger and an outwardly directed outlet for directing formed auger toward an inner periphery of the cylindrical receptacle; rotating the cylindrical receptacle and allowing the feed guide to rotate about the axis of its inlet that is roughly coincident with an axis of auger entering the axial inlet of the feed guide such that the outwardly directed outlet may move around an interior of the cylindrical receptacle in a circular path to direct auger toward the inner periphery of the cylindrical receptacle and form a coil thereof, wherein the cylindrical receptacle is rotated at a speed selected to counteract the rotation of the auger about its own axis.

Further features of the first aspect of the disclosure provide for the speed of rotation of the feed guide about its inlet axis to be substantially the same as the speed of rotation of the auger about its axis; for the speed of rotation of the cylindrical receptacle to be selected according to the peripheral speed of the receptacle and the axial speed of movement of the coreless auger; for the inlet axis to be located in a generally vertical orientation to receive downwardly moving auger; for the feed guide to be movable axially relative to the cylindrical receptacle so that the feed guide can be moved axially away from a remote end of the cylindrical receptacle as auger is coiled therein; for the feed guide to be mounted on a carriage movable along a plurality of tracks extending parallel to the axis of the cylindrical receptacle; and for the cylindrical receptacle to be an open topped drum supported on a coaxial rotatable support.

A still further feature of the first aspect of the disclosure provides for auger stored in the temporary cylindrical receptacle to be periodically withdrawn from storage and wound onto a conventional bobbin or mandrel to produce auger that is packaged in a suitable manner for storage and transport purposes.

In accordance with a second aspect of the disclosure, there is provided a temporary storage facility for use in an auger production facility, the temporary storage facility comprising a frame supporting a relatively rotatable cylindrical receptacle and a feed guide rotatable about the axis of the rotatable cylindrical receptacle and having an inlet for receiving auger in an axial direction and an outlet directed outwardly toward a remote end of the cylindrical receptacle wherein the cylindrical receptacle has a drive for rotating it at a speed selected to accommodate a linear motion component of received auger.

A further feature of the second aspect of the disclosure provides for the feed guide to be carried by a carriage that is movable in the axial direction relative to the cylindrical receptacle along co-operating tracks carried by the frame.

Additional features of the second aspect of the disclosure will become apparent from the foregoing in relation to the first aspect being the method of the disclosure and from what follows.

In order that the above and other features of the disclosure may be more fully understood, one embodiment thereof will now be described, by way of example only, with reference to the accompanying drawings.

DETAILED DESCRIPTION

Figure 1:
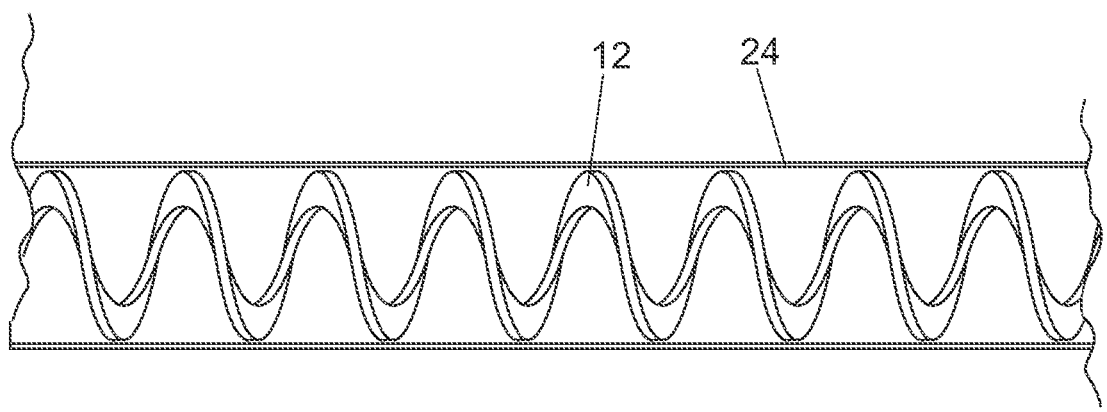
FIG. 1 is a schematic cross-sectional side elevation view of a coreless auger of the general nature with which this disclosure is concerned with the auger being positioned in a conveyor tube as it would be in use.
Figure 2:
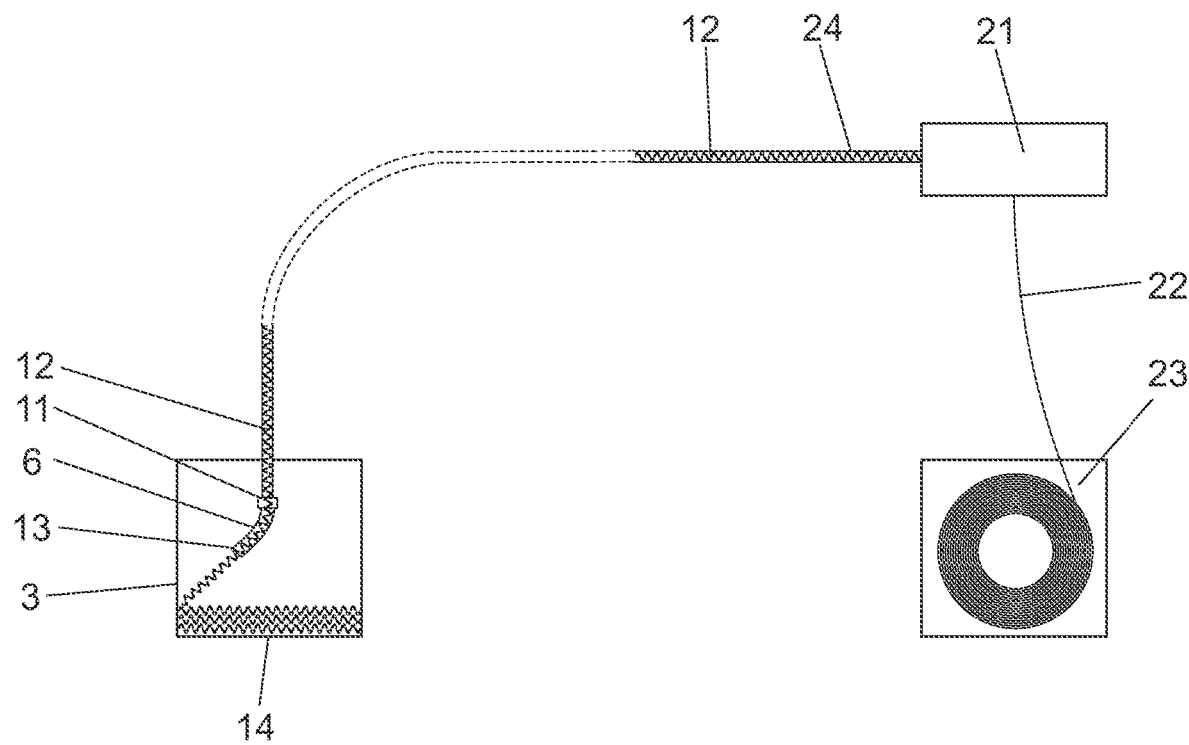
FIG. 2 is a schematic diagram illustrating the manufacture and temporary storage of auger according to one embodiment of this disclosure.
Figure 3:
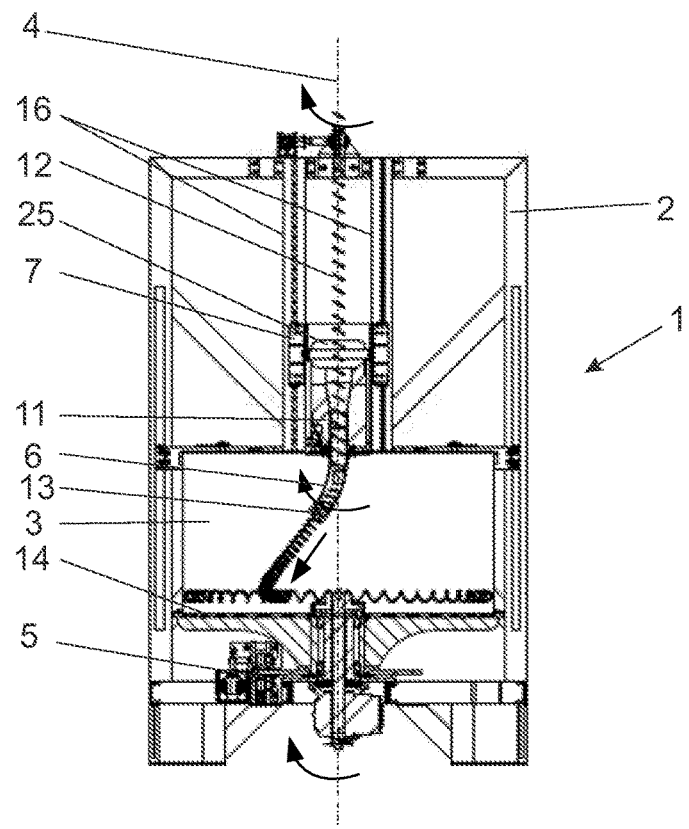
FIG. 3 is an schematic cross-sectional elevation view of the temporary storage facility of this embodiment of the disclosure.
Figure 5:
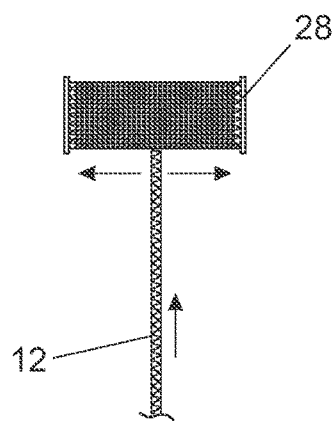
FIG. 5 is a schematic view illustrating the transfer of the formed auger from the temporary storage facility according to the disclosure to a bobbin or mandrel on which a coil of auger is formed for storage and transport purposes.

In the embodiment of the disclosure illustrated in the drawings, a temporary storage facility 1 for use in an auger production facility comprises a frame 2 supporting a relatively rotatable cylindrical receptacle 3 in the form of an open topped drum that is rotatable about a vertical axis 4 by means of a suitable drive 5. A feed guide 6 that is carried by a vertically movable carriage 7 is rotatable about the axis of the rotatable cylindrical receptacle 3.

The feed guide 6 has an uppermost inlet 11 that is directed upwards and is coaxial with the axis of the cylindrical receptacle 3 for receiving auger 12 moving downwards in an axial direction. That inlet 11 merges with a smoothly curved guide path through the feed guide 6 that terminates in an outwardly and downwardly directed outlet 13 directed toward a blind remote end 14 of the cylindrical receptacle 3. The feed guide 6 is carried by the carriage 7 that is movable in the axial direction relative to the cylindrical receptacle 3 along upright rails 16 supported by the frame 2. The feed guide 6 is arranged to rotate it at a speed selected to counteract the rotation of auger around its own axis and therefore eliminate that rotation.

The drive 5 of the cylindrical receptacle 3 is selected to rotate it at a speed selected to accommodate the linear motion component and the axial motion component of movement of an auger produced in a conventional auger production machine 21.

The temporary storage facility 1 described above enables the method of this disclosure to be implemented. The method for handling coreless auger produced by an auger production machine 21 from which the coreless auger 12 emerges with both a linear motion component and a rotational motion component includes guiding the rotating auger for linear movement away from the production machine 21 and toward the temporary storage facility 1. As a general rule, the axis of the coreless auger is generally horizontal when it moves out of the auger production machine 21, and in this embodiment of the disclosure, the temporary storage facility 1 has a vertical axis. The auger production machine 21 is supplied with flat wire 22 from a de-coiler 23.

A suitable guide tube or pipe 24 is used to guide the auger from the auger production machine to the vertical inlet 11 of the feed guide 6 of the temporary storage facility 1. The stationary guide tube or pipe 24 terminates in a vertical communication chamber 25 in order to feed formed auger vertically downwards into the rotating inlet 11 of the feed guide 6 that is directed upwards. The auger 12 is flexed by the feed guide 6 to deviate from the downwards vertical direction to an outwardly inclined direction from the outlet 13 that serves to direct the auger 12 toward an inner periphery of the cylindrical receptacle 3. Rotating the feed guide 6 about the axis of its inlet 11, which is roughly coincident with the axis of auger entering the feed guide causes the outwardly directed outlet 13 to sweep around the interior of the receptacle 3 in a circular path with the result that it directs the auger toward the inner periphery of the cylindrical receptacle.

The speed and direction of rotation of the feed guide 6 about its inlet axis are selected to counteract, and, in fact, cancel, the rotational movement of the auger 12 about its own axis. The speed of rotation of the feed guide 6 about its inlet axis is substantially the same as the speed of rotation of the auger 12 about its axis at the time of entry into the feed guide inlet. Nevertheless, the speed may vary slightly to achieve a sufficient coiling effect of the auger 12 within the cylindrical receptacle 3.

Figure 4:
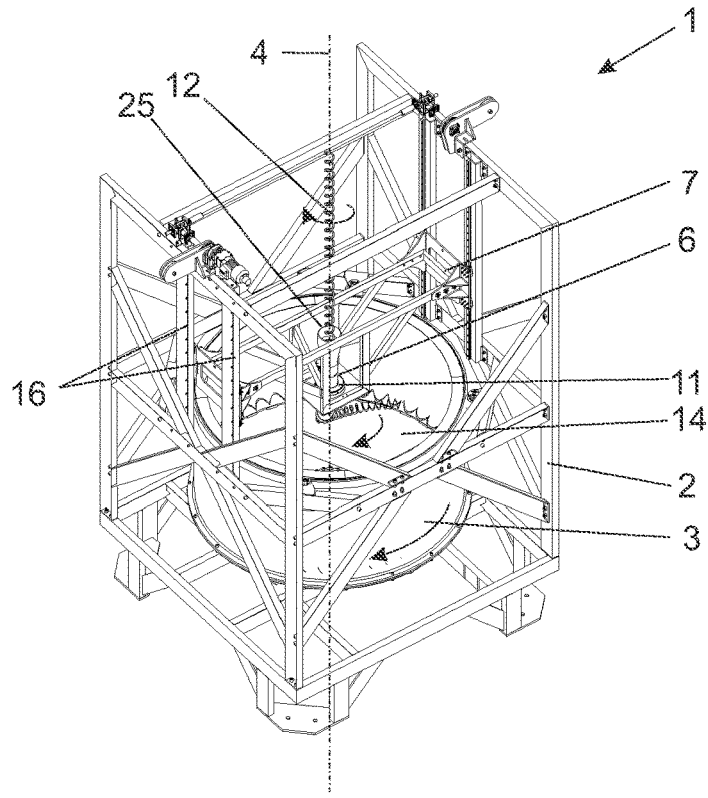
FIG. 4 is a schematic three-dimensional view of the embodiment of FIG. 3.

As indicated above, the feed guide 6 is carried by the carriage 7, which is movable in the axial direction relative to the cylindrical receptacle 3 along the upright rails 16. Movement of the carriage 7 can be effected in any suitable manner, but is conveniently effected by multiple chains or cable (not shown) that are operated in unison in respect of the four rails 16. This drive arrangement for the carriage can be activated electronically by suitable sensors or can be coordinated with the revolutions of the feed guide for a particular size of auger. It will be clear from reference to FIG. 4 that the auger is fed toward the inside wall of the drum at or toward its periphery.

The cylindrical receptacle is simultaneously rotated at a speed controlled to receive the auger being coiled and accommodate the linear motion component of the produced auger. The speed of rotation of the cylindrical receptacle is thus selected according to the peripheral speed of the receptacle and the axial speed of movement of the coreless auger.

As indicated above, once an appropriate length of auger has been coiled in the temporary cylindrical receptacle, it needs to be withdrawn from such temporary storage and wound onto a conventional bobbin or mandrel 28 to produce auger that is packaged in a suitable manner for storage and transport purposes. This can easily be achieved by allowing the cylindrical receptacle to rotate whilst the auger is withdrawn through the feed guide that may be allowed to remain approximately stationary during this second stage of the process.

It will be understood that the capacity of the cylindrical receptacle can be selected such that a substantially greater length of auger can be accommodated in it in a coiled condition depending on the gauge and configuration of the auger than in the instance of prior art tubular storage units that have a finite length and occupy considerable space. It is envisaged that it may be possible to store up to about 5000 meters of a smaller diameter auger and up to about 1000 meters of a larger diameter auger. The indication of estimates given above is not intended in any way to be limiting to the scope of the disclosure, which may be implemented simply for convenience reasons or for the purpose of saving space occupied by a production facility.

Numerous variations may be made to the embodiment of the disclosure and its implementation that are described above without departing from the scope hereof.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the application is intended to be illustrative, but not limiting, of the scope of the invention, which is set forth in the following claims.

Throughout the specification and claims, unless the contents require otherwise, the word "comprise" or variations such as "comprises" or "comprising" will be understood to imply the inclusion of a stated integer or group of integers but not the exclusion of any other integer or group of integers.

The invention claimed is:

1. A method for the handling of coreless auger produced by an auger production machine from which the coreless auger emerges with a linear motion component and a rotational motion component, the method comprising the steps of:
   guiding the coreless auger with the rotational motion component for linear movement away from the production machine toward a temporary storage facility that has a cylindrical receptacle rotatable about its own axis and a coaxial rotatable feed guide having an axial inlet for formed rotating coreless auger and an outwardly directed outlet for directing formed auger toward an inner periphery of the cylindrical receptacle; and
   rotating the cylindrical receptacle and allowing the coaxial rotatable feed guide to rotate about the axis of its inlet that is roughly coincident with an axis of the rotating coreless auger entering the axial inlet of the coaxial rotatable feed guide such that the outwardly directed outlet may move around an interior of the cylindrical receptacle in a circular path to direct the rotating coreless auger toward the inner periphery of the cylindrical receptacle and form a coil thereof, wherein a speed of rotation of the cylindrical receptacle is selected to counteract a speed of rotation of the rotating coreless auger about its own axis.

2. The method as recited in claim 1, wherein a speed of rotation of the coaxial rotatable feed guide about the axis of its axial inlet is substantially the same as the speed of rotation of the rotating coreless auger about its axis.

3. The method as recited in claim 2, wherein the axis of its axial inlet is located in a generally vertical orientation to receive the downwardly moving rotating coreless auger.

4. The method as recited in claim 1, wherein the speed of rotation of the cylindrical receptacle is selected according to a peripheral speed of the receptacle and the speed of rotation of the rotating coreless auger about its axis.

5. The method as recited in claim 1, wherein the coaxial rotatable feed guide is movable axially relative to the cylindrical receptacle so that the coaxial rotatable feed guide can be moved axially away from a remote end of the cylindrical receptacle as the rotating coreless auger is coiled therein.

6. The method as recited in claim 1, wherein the coaxial rotatable feed guide is mounted on a carriage movable along a plurality of tracks extending parallel to the axis of the cylindrical receptacle.

7. The method as recited in claim 1, wherein the cylindrical receptacle is an open topped drum supported on a coaxial rotatable support.

8. The method as recited in claim 1, the method further comprising a step of periodically withdrawing the coreless auger stored in the cylindrical receptacle from storage and winding it onto a conventional bobbin or mandrel to produce coreless auger that is packaged in a suitable manner for storage and transport purposes.

9. A temporary storage facility for use in an auger production facility, the temporary storage facility comprising a frame supporting a relatively rotatable cylindrical receptacle rotatable about its own axis and a coaxial rotatable feed guide having an axial inlet for receiving auger in an axial direction and an outlet directed outwardly toward a remote end of the rotatable cylindrical receptacle, wherein the coaxial rotatable feed guide is configured to rotate about an axis of its axial inlet that is operatively roughly coincident with an axis of auger entering the axial inlet of the coaxial rotatable feed guide such that the outwardly directed outlet is rotatable about an axis of the rotatable cylindrical receptacle to operatively move around an interior of the rotatable cylindrical receptacle in a circular path to direct auger towards an inner periphery of the rotatable cylindrical receptacle and form a coil thereof, wherein the rotatable cylindrical receptacle has a drive for rotating it at a speed selected to accommodate a linear motion component of received auger and counteract the rotation of the auger about its own axis.

10. The temporary storage facility as recited in claim 9, wherein the coaxial rotatable feed guide is carried by a carriage that is movable in an axial direction relative to the rotatable cylindrical receptacle along cooperating tracks carried by the frame.

* * * * *